United States Patent
Kimura et al.

(10) Patent No.: US 10,827,100 B2
(45) Date of Patent: *Nov. 3, 2020

(54) PRINTING APPARATUS CONFIGURED TO DISPLAY CODE IMAGE WITHOUT CHANGING COLOR, METHOD OF CONTROLLING THE SAME, AND STORAGE MEDIUM

(71) Applicant: CANON KABUSHIKI KAISHA, Tokyo (JP)

(72) Inventors: Tomohiro Kimura, Matsudo (JP); Kou Hiraike, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,101

(22) Filed: Aug. 22, 2019

(65) Prior Publication Data
US 2019/0379803 A1 Dec. 12, 2019

Related U.S. Application Data

(63) Continuation of application No. 15/597,215, filed on May 17, 2017, now Pat. No. 10,432,823.

(30) Foreign Application Priority Data

May 20, 2016 (JP) ................................. 2016-101937

(51) Int. Cl.
*H04N 1/60* (2006.01)
*H04N 1/00* (2006.01)
*H04N 1/32* (2006.01)

(52) U.S. Cl.
CPC ............ *H04N 1/60* (2013.01); *H04N 1/0044* (2013.01); *H04N 1/0049* (2013.01);
(Continued)

(58) Field of Classification Search
None
See application file for complete search history.

(56) References Cited

U.S. PATENT DOCUMENTS 6,308,023 B1   10/2001   Nomura et al.
7,088,460 B2    8/2006   Toyama et al.
(Continued)

FOREIGN PATENT DOCUMENTS

CN   1713685 A   12/2005
CN   1809114 A    7/2006
(Continued)

OTHER PUBLICATIONS

Office Action issued in Chinese Appln. No. 2017103380449 dated Dec. 10, 2019. English translation provided.
(Continued)

*Primary Examiner* — Thomas D Lee
(74) *Attorney, Agent, or Firm* — Rossi, Kimms & McDowell LLP

(57) ABSTRACT

A printing apparatus of the present invention has a printer unit, a display unit for displaying a screen, and a setting unit for setting either of a first setting for displaying the screen by standard color information and a second setting for displaying the screen by color information different to the standard color information. If the second setting is set, the color information of the screen displayed by the display unit is changed, and if a code image to be read by an external apparatus is included in the screen displayed by the display unit, the code image is made to not be displayed in a state in which color information of the code image is changed even if the second setting is set.

15 Claims, 9 Drawing Sheets

(52) U.S. Cl.
CPC ..... *H04N 1/00307* (2013.01); *H04N 1/00334* (2013.01); *H04N 1/32122* (2013.01); *H04N 2201/0075* (2013.01); *H04N 2201/0082* (2013.01); *H04N 2201/0094* (2013.01); *H04N 2201/3205* (2013.01); *H04N 2201/3208* (2013.01); *H04N 2201/3269* (2013.01); *H04N 2201/3273* (2013.01)

(56) References Cited

U.S. PATENT DOCUMENTS

| | | | |
|---|---|---|---|
| 7,455,229 | B2 | 11/2008 | Tanaka |
| 7,602,409 | B2 | 10/2009 | Sato |
| 8,437,651 | B2 | 5/2013 | Kamata |
| 8,599,437 | B2 | 12/2013 | Yanagisawa |
| 8,610,906 | B2 | 12/2013 | Miyata |
| 8,640,041 | B2 | 1/2014 | Miyata |
| 8,994,986 | B2 | 3/2015 | Yamada |
| 10,432,823 | B2 * | 10/2019 | Kimura ................ H04N 1/0049 |
| 2002/0002565 | A1 | 1/2002 | Ohyama |
| 2006/0167573 | A1 | 7/2006 | Yamada |
| 2013/0063747 | A1 | 3/2013 | Sugimura |

FOREIGN PATENT DOCUMENTS

| | | |
|---|---|---|
| CN | 101256474 A | 9/2008 |
| CN | 101533340 A | 9/2009 |
| CN | 101996057 A | 3/2011 |
| CN | 102014227 A | 4/2011 |
| CN | 102196142 A | 9/2011 |
| EP | 1063839 A2 | 12/2000 |
| EP | 1758045 A1 | 2/2007 |
| JP | S62282373 A | 12/1987 |
| JP | 2001166642 A | 6/2001 |
| JP | 2008213294 A | 9/2008 |
| JP | 2013218508 A | 10/2013 |

OTHER PUBLICATIONS

Extended European Search Report issued in European Appln. No. 17168940.9 dated Nov. 29, 2017.
Office Action issued in U.S. Appl. No. 15/597,215 dated Mar. 22, 2018.
Notice of Allowance issued in U.S. Appl. No. 15/597,215 dated Sep. 11, 2018.
Office Action issued in U.S. Appl. No. 15/597,215 dated Dec. 14, 2018.
Notice of Allowance issued in U.S. Appl. No. 15/597,215 dated Jun. 5, 2019.
Office Action issued in Japanese Appln. No. 2016-101937 dated Feb. 21, 2020.

* cited by examiner

(12) United States Patent

PRINTING APPARATUS CONFIGURED TO DISPLAY CODE IMAGE WITHOUT CHANGING COLOR, METHOD OF CONTROLLING THE SAME, AND STORAGE MEDIUM

BACKGROUND OF THE INVENTION

Field of the Invention

The present invention relates to a printing apparatus and a method of controlling the same.

Description of the Related Art

In recent years, in devices provided with a camera such as a mobile terminal, many are mounted with a barcode reader function and can obtain information from a barcode such as a QR (Quick Response) code (registered trademark). In addition, for an information processing apparatus such as a printing apparatus, apparatuses that can use barcode data to provide information are increasing. For example, Japanese Patent Laid-Open No. 2008-213294 recites displaying authentication information for wireless by a QR code.

In addition, for an information processing apparatus, there are those provided with a function for performing a color reversal on a screen such as for a console unit and then displaying, as a function for realizing universal design.

Displaying a barcode after performing a color reversal in an information processing apparatus provided with a barcode display and a function for reversed-color display of a screen as described above is considered. In such a case, there is a problem in that, even though a mobile terminal attempts to read the barcode displayed by the information processing apparatus, the mobile terminal cannot correctly recognize the barcode because the barcode is subjected to the color reversal.

SUMMARY OF THE INVENTION

An aspect of the present invention is to eliminate the above-mentioned problem with conventional technology.

A feature of the present invention is to provide a technique to enable an external apparatus to correctly recognize a code image even if a printing apparatus displays a screen in accordance with color information that is different to standard color information.

According to a first aspect of the present invention, there is provided a printing apparatus, comprising: a printer unit; a display unit configured to display a screen; a memory storing a set of instructions; and one or more processors that execute instructions of the set of the instructions and cause the image processing apparatus to function as: a setting unit configured to set either of a first setting for displaying a screen in accordance with standard color information, and a second setting for displaying a screen in accordance with color information different to the standard color information; and a processing unit configured to change color information of a screen and cause the display unit to display the screen in a case where the second setting is set by the setting unit, wherein the processing unit does not cause the display unit to display the code image in a state in which color information of the code image is changed if a code image to be read by an external apparatus is included in the screen displayed by the display unit, even if the second setting is set by the setting unit.

According to a second aspect of the present invention, there is provided a method of controlling a printing apparatus having a printer unit and a display unit configured to display a screen, the method comprising: setting either of a first setting for displaying a screen in accordance with standard color information, and a second setting for displaying a screen in accordance with color information different to the standard color information; changing color information of a screen and causing the display unit to display the screen in a case where the second setting is set in the setting; and causing the display unit not to display the code image in a state in which color information of the code image is changed if a code image to be read by an external apparatus is included in the screen displayed by the display unit, even if the second setting is set in the setting.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
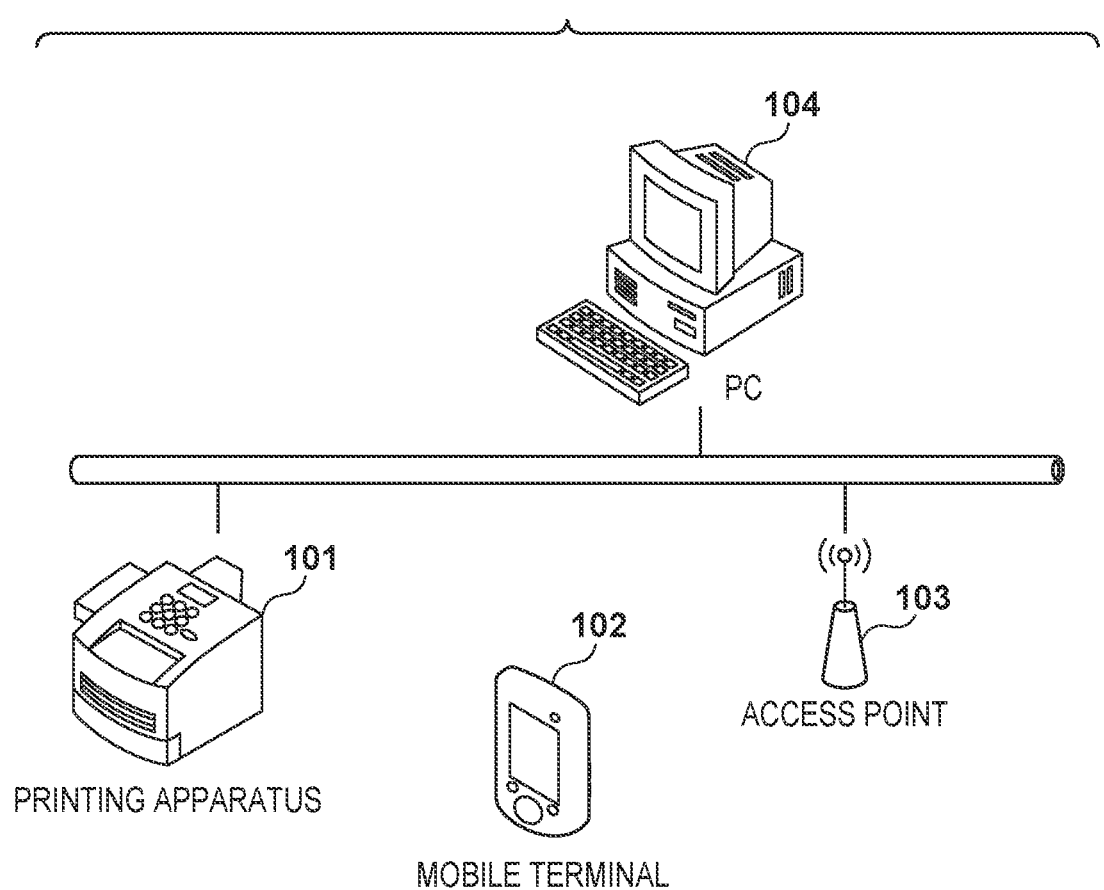
FIG. 1 depicts a view illustrating an example of a configuration of a system according to embodiments of the present invention.

FIG. 1 depicts a view illustrating an example of a configuration of a system according to the embodiments of the present invention.

A printing apparatus 101 has a wireless communication function, and is capable of network communication with a mobile terminal 102, an access point 103, and a PC 104. Note that the network communication is not limited to wireless communication, and may be wired communication.

In the present embodiment, explanation is given regarding an example in which the printing apparatus 101 uses a QR code to provide the mobile terminal 102 with information for establishing network communication between both devices. Note that information that the printing apparatus 101 uses the QR code to provide is not limited to information relating to a network.

In addition, the printing apparatus 101 has two display modes: a normal display mode for displaying, on a console unit 205 (FIG. 2), a screen without reversing standard color information, and a reversed-color display mode for displaying a screen for which color information is reversed. The reversed-color display mode is a mode for reversing display colors of a screen and providing the screen to a user who has an idiosyncrasy with their color vision, and is intended to improve visibility for such a user.

Figure 2:
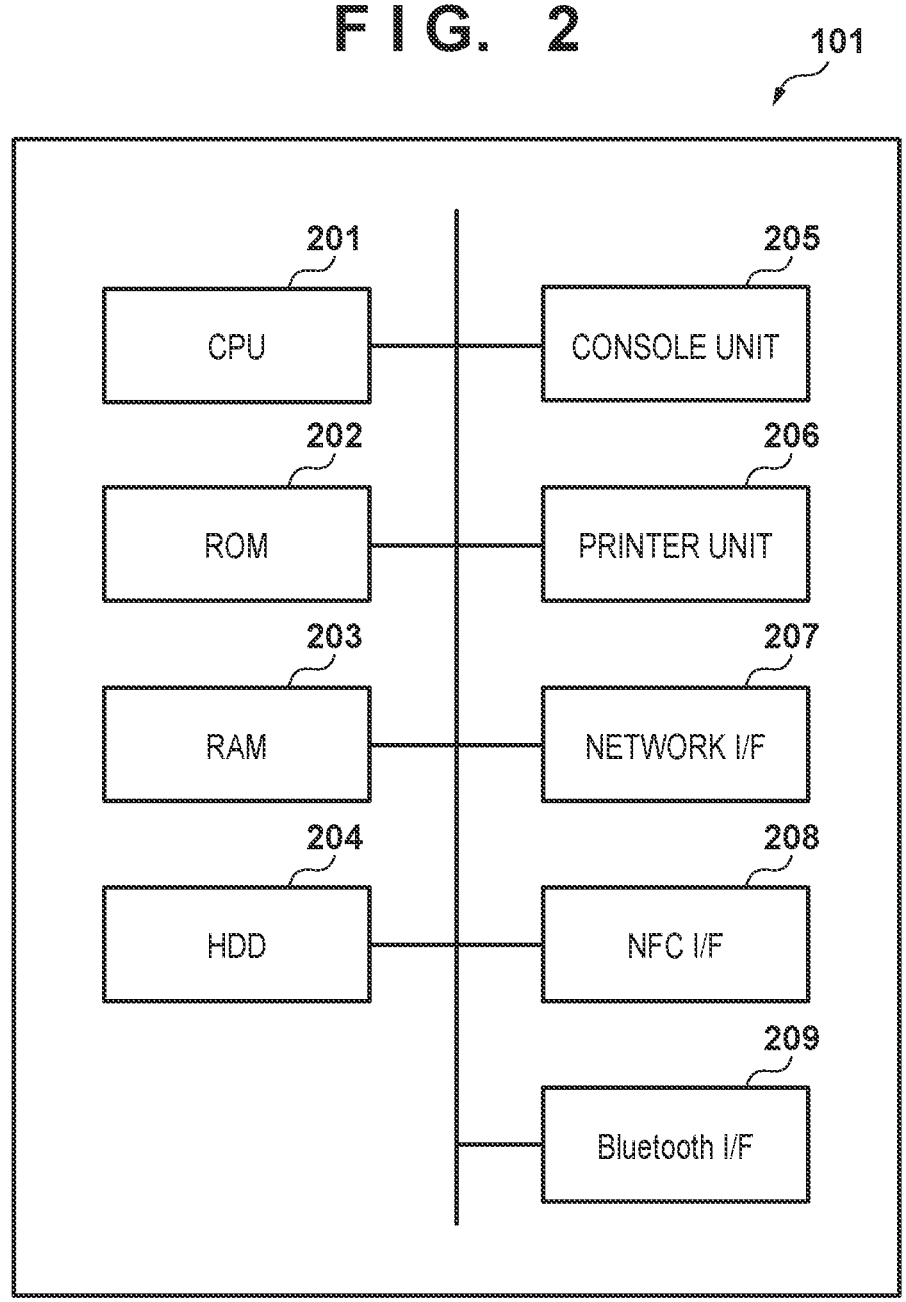
FIG. 2 is a block diagram for describing an example of a hardware configuration of a printing apparatus according to the embodiments.

FIG. 2 is a block diagram for describing an example of a hardware configuration of the printing apparatus 101 according to the embodiments.

A CPU 201 controls all operations of the printing apparatus 101. The CPU 201 executes a boot program stored in a ROM 202, deploys a program and an OS stored in a HDD 204 to a RAM 203, and executes the deployed program to thereby control operation of the printing apparatus 101. The RAM 203 is a volatile memory that the CPU 201 uses, for example as a work area for executing various programs. The HDD (hard disk drive) 204 stores data corresponding to components (screen components) for configuring a screen that includes various control programs, various setting information such as an SSID and a wireless authentication key of the printing apparatus 101, or a QR code. A console unit 205 has a display unit equipped with a touch panel function that a user can operate, and displays an operation screen in either of the normal display mode or the reversed-color display mode. A printer unit 206 prints an image on printing paper (a sheet) in accordance with image data transferred via an internal bus. A network I/F (an interface) 207 has a NIC (Network Interface Card) for connecting to a network and is equipped with a wireless communication function. Because of this, the printing apparatus 101 can communicate with an external apparatus such as the mobile terminal 102 via the network I/F 207. An NFC I/F 208 is a chip equipped with an NFC (Near Field Communication) communication function. A Bluetooth (registered trademark) I/F 209 is a chip equipped with a Bluetooth communication function.

Figure 3:
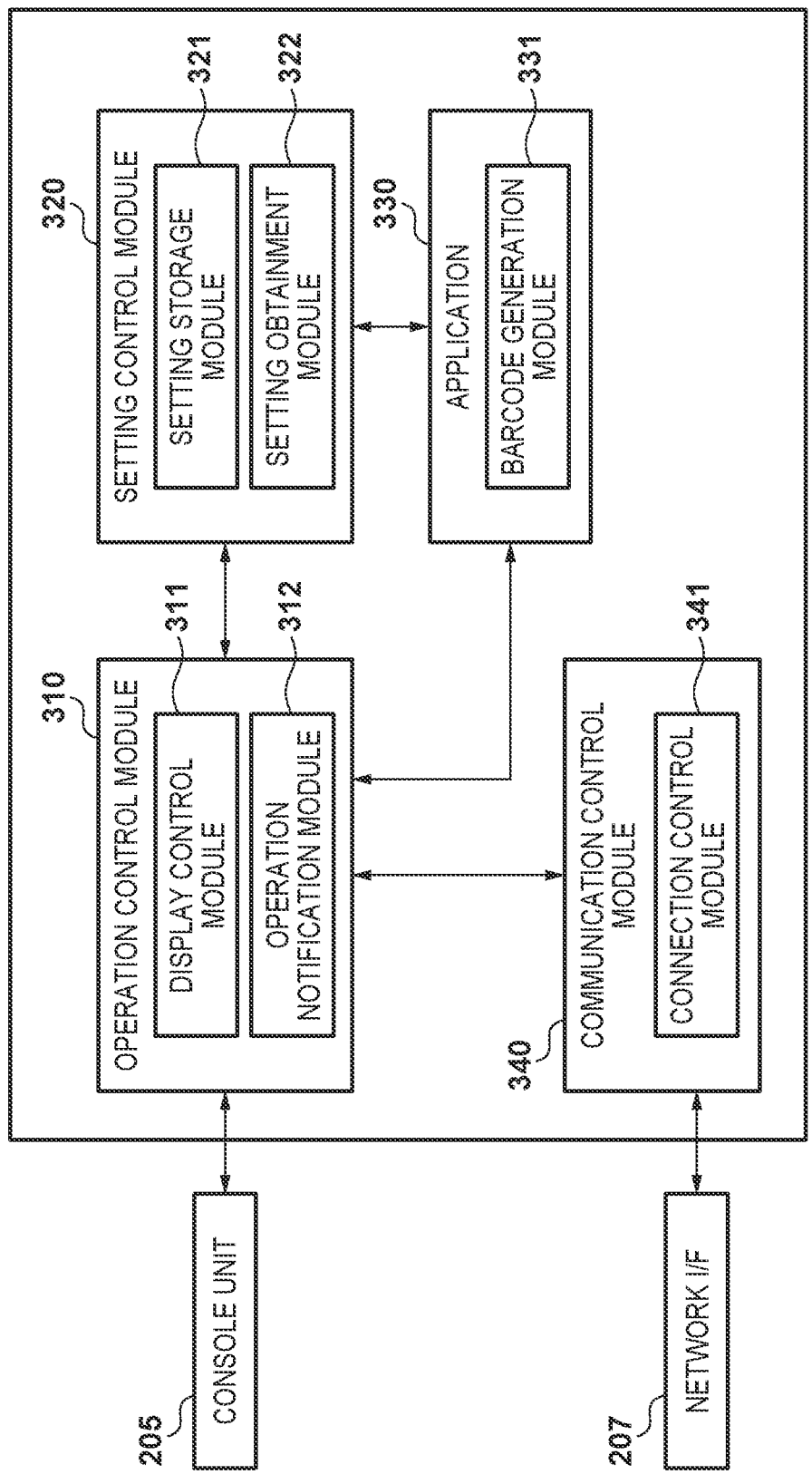
FIG. 3 is a functional block diagram for explaining a function that the printing apparatus according to the embodiments has.

FIG. 3 is a functional block diagram for explaining functions that the printing apparatus 101 according to the embodiments has. Functions of the units illustrated in FIG. 3 are realized by the CPU 201 executing a program that is deployed to the RAM 203.

The functions include an operation control module 310, a setting control module 320, an application 330 and a communication control module 340. The operation control module 310 has a display control module 311 and an operation notification module 312. The display control module 311 performs processing to display a screen on the console unit 205. The display control module 311 also executes processing to display a screen using screen components, color reversal processing of a screen component, and the like. The operation notification module 312 performs input processing with respect to information inputted via the console unit 205.

The setting control module 320 has a setting storage module 321 and a setting obtainment module 322. The setting storage module 321 performs processing to save setting data to the HDD 204. The setting obtainment module 322 performs read processing of setting data stored in the ROM 202 and the HDD 204.

The application 330 is an application for generating a QR code, for example. A barcode generation module 331 generates barcode data based on an instruction from the operation control module 310. This generation of the barcode data is processed based on setting data obtained from the setting control module 320 and generated barcode data is stored in the HDD 204 via the setting control module 320.

A communication control module 340 controls the network I/F 207. A connection control module 341 performs connection processing with the mobile terminal 102 and the access point 103, in accordance with an instruction from the operation control module 310.

First Embodiment

Figure 4A:
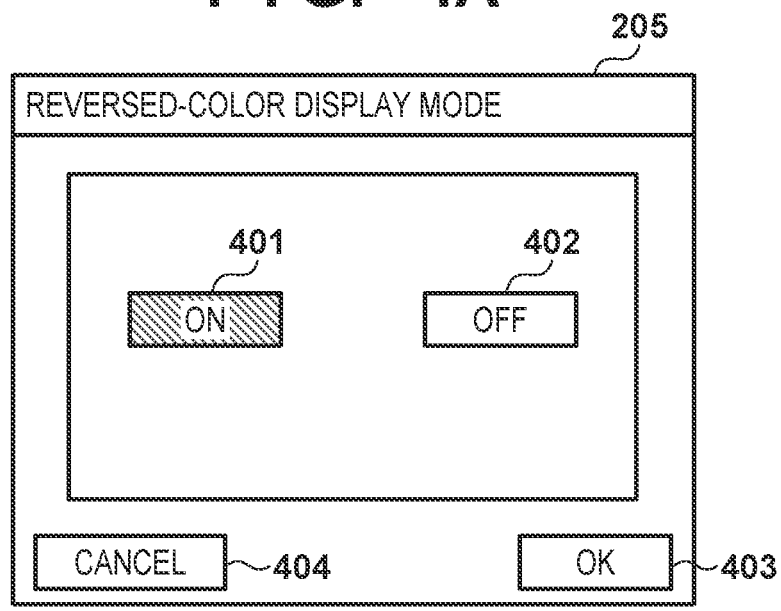
FIGS. 4A and 4B depict views respectively illustrating examples of a setting screen displayed in a console unit of a printing apparatus according to a first embodiment.

FIG. 4A depicts a view illustrating an example of a setting screen displayed on the console unit 205 of the printing apparatus 101 according to a first embodiment of the present invention.

FIG. 4A illustrates an example of a setting screen for setting a reversed-color display mode for a screen. Via this screen, an operator can set either of the normal display mode and the reversed-color display mode. By this screen, when an operator selects an ON button 401, the reversed-color display mode is set and the printing apparatus 101 operates in the reversed-color display mode, and when the operator selects an OFF button 402, the normal display mode is set and the printing apparatus 101 operates in the normal display mode. In FIG. 4A, when an OK button 403 is pressed, a setting in this screen is stored to the HDD 204 as setting information, and when a cancel button 404 is pressed, a setting in this screen is cancelled.

Figure 5A:
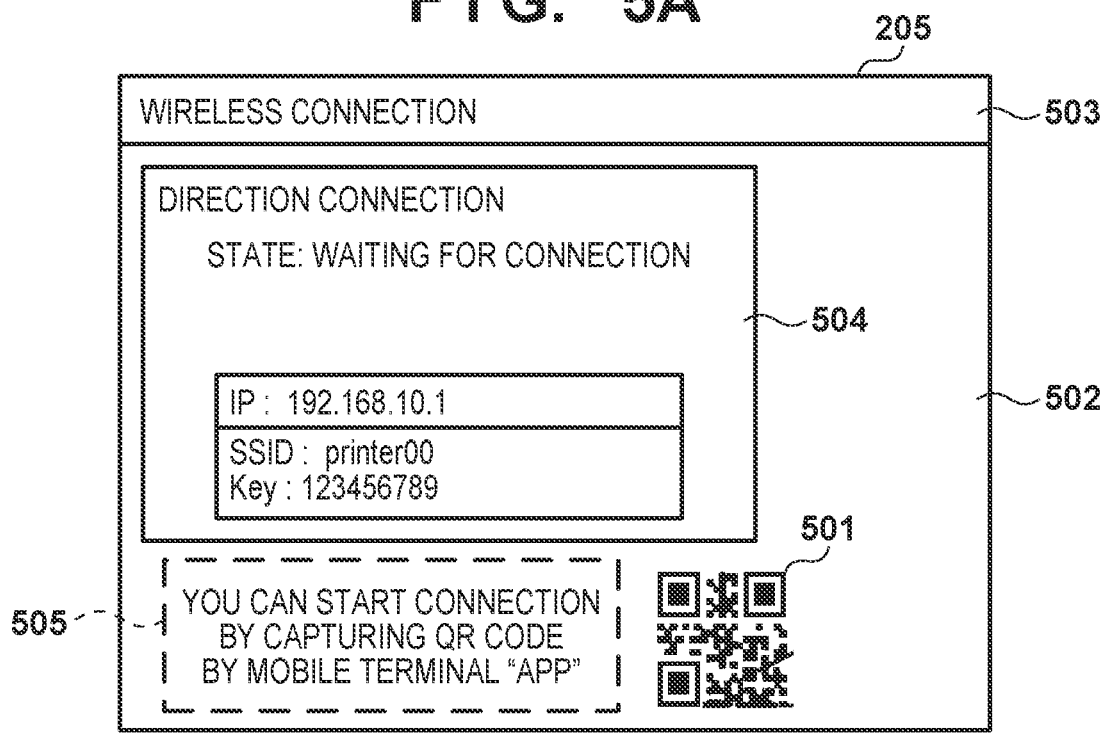
FIGS. 5A and 5B depict views respectively illustrating examples of a display screen when the printing apparatus according to the embodiments uses a QR code to provide authentication information for wireless communication.
Figure 5B:
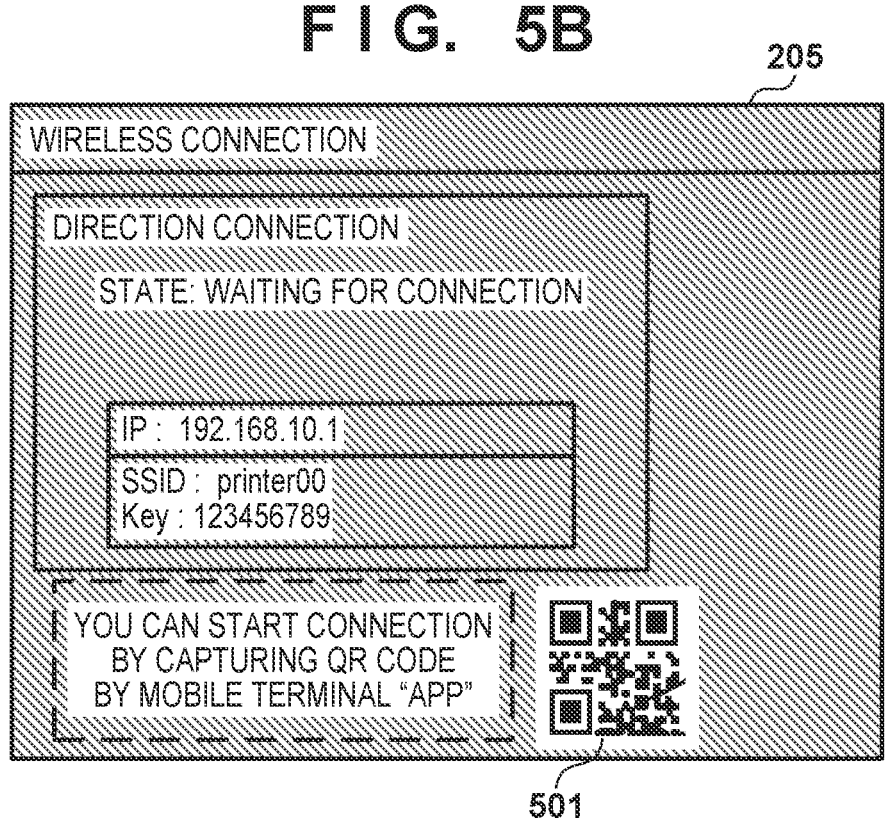

FIG. 5A and FIG. 5B depict views illustrating examples of a display screen when the printing apparatus 101 according to the first embodiment uses a QR code to provide authentication information for wireless communication. These screen are both displayed on the console unit 205.

FIG. 5A illustrates an example of a screen displayed on the console unit 205 when the printing apparatus 101 is in the normal display mode. FIG. 5B illustrates an example of a screen displayed on the console unit 205 when the printing apparatus 101 is in the reversed-color display mode. Here, in both display modes, a QR code 501 is displayed without a color reversal. Note that, in the first embodiment, a QR code is exemplified as a code, but a code that the printing apparatus 101 handles is not limited to the QR code. The first embodiment can be applied to a case of displaying or printing an image that illustrates a code such as a barcode or a QR code, for example.

Note that a screen may be configured by a combination of a plurality of screen components. For example, the screen illustrated in FIGS. 5A and 5B includes five screen component: the QR code 501, a background 502, a title 503, network information 504, and a message 505.

Hereinafter, the first embodiment of the present invention will be described. In the first embodiment, explanation is given of an example in which the CPU 201 functions as the display control module 311 and displays a screen at a time of the reversed-color display mode by performing color reversal processing for each screen component.

Figure 6:
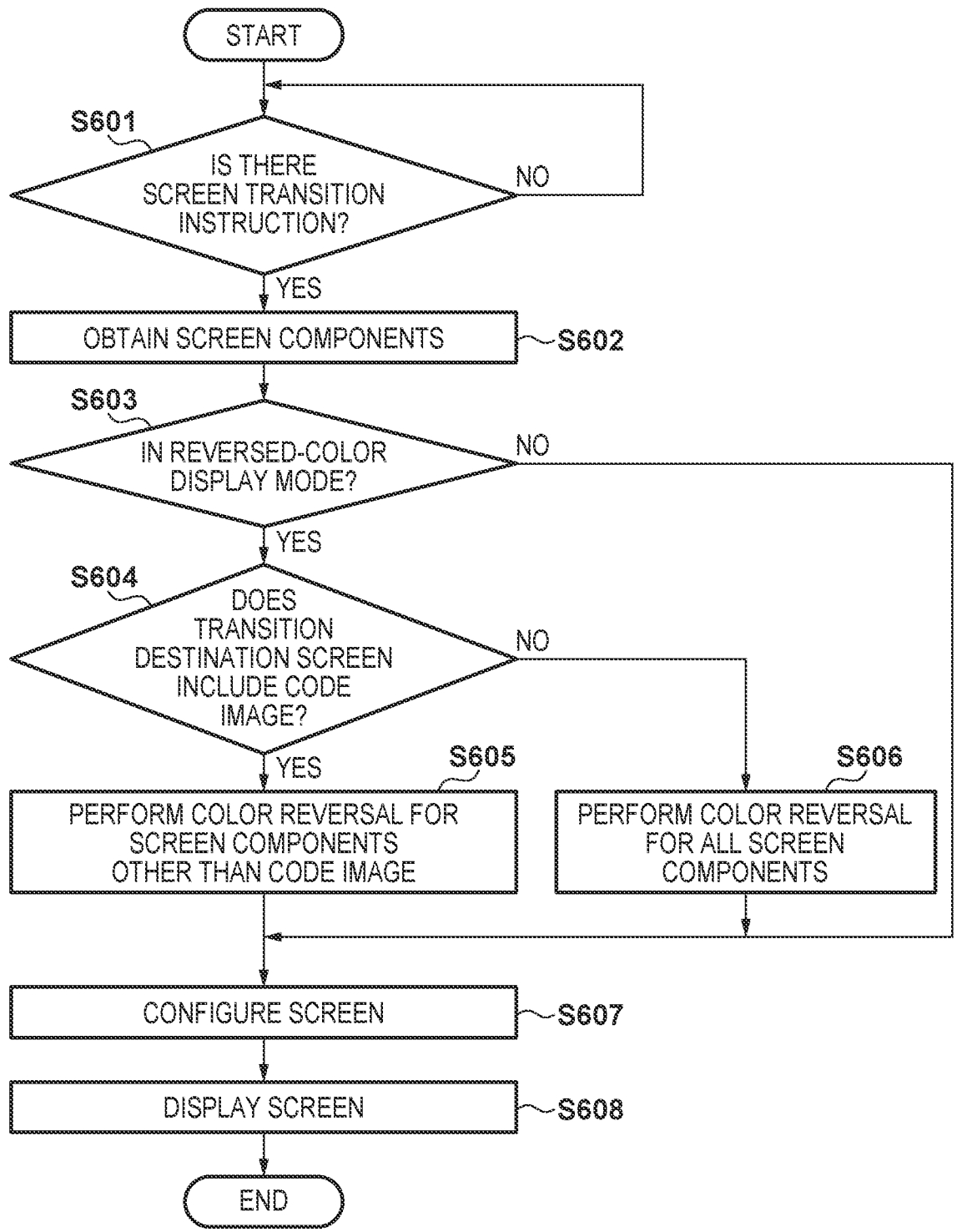
FIG. 6 is a flowchart for describing processing when the printing apparatus according to a first embodiment displays a screen in the console unit.

FIG. 6 is a flowchart for describing processing when the printing apparatus 101 according to the first embodiment displays a screen in the console unit 205. Note that this processing is realized by the CPU 201 deploying a program stored in the HDD 204 to the RAM 203 and executing the deployed program.

Firstly, in step S601 the CPU 201 functions as the operation notification module 312, and determines whether an event for transitioning a screen displayed on the console unit 205 to another screen has occurred upon detecting that an operator has operated the console unit 205. Upon detecting the occurrence of this event, the processing proceeds to step S602, and the CPU 201 functions as the setting obtainment module 322 and obtains a screen component to be displayed by a transition destination screen.

Next, the processing proceeds to step S603, and the CPU 201 determines which of the normal display mode and the reversed-color display mode is set. Here the setting information stored in the HDD 204 after being set by the setting screen of FIG. 4A is obtained, and the determination is performed based on the setting information. If the CPU 201 determines in step S603 that the reversed-color display mode is set, the processing proceeds to step S604, and otherwise, in other words upon determining that the normal display mode is set, the processing proceeds to step S607.

In step S604, the CPU 201 determines whether or not the transition destination screen includes a code image such as the QR code. If it is determined that it includes a code image such as QR data, the processing proceeds to step S605 and otherwise the processing proceeds to step S606. In step S605, the CPU 201 functions as the display control module 311, and performs a color reversal for screen components other than code images. A method for realizing the color reversal is to convert each value that expresses RGB of each pixel of a screen component to a value for which a bit reversal has been performed. For example if it is a value that expresses 256 tones by 8 bits, a value obtained by subtracting "256" from original data is a value for which a bit reversal has been performed. Meanwhile, if it is determined that the transition destination screen does not include a code image such as the QR code, the processing proceeds to step S606, and the color reversal is executed for all of the screen components. Note that color reversal processing of a screen component is executed by the CPU 201 for each screen component. In this way, when processing with respect to the screen components ends in step S605 or step S606, the processing proceeds to step S607, and the CPU 201 functions as the display control module 311, and uses each screen component for which the processing has ended to generate the screen. Then the processing proceeds to step S608, and the CPU 201 functions as the display control module 311, displays the screen generated in step S607 on the console unit 205, and this processing ends.

Note that, if the CPU 201 determines the normal display mode in step S603, the processing proceeds to step S607, and the screen components are used to generate the screen without executing color reversal processing. In step S608 the CPU 201 then displays the screen for which the screen components are not subject to reversed display on the console unit 205, and this processing terminates.

Note that, in the first embodiment, explanation was given of an example in which pixel data represents 256 tones by 8 bits, but as another embodiment configuration may be taken use a different algorithm to execute color reversal. In addition, the color space is not limited to RGB, and may be another color space such as CMYK or HSV.

By the first embodiment as explained above, even if a reversed-color display mode is set, it is possible to display a code image such as the QR code without reversal.

Second Embodiment

Figure 4B:
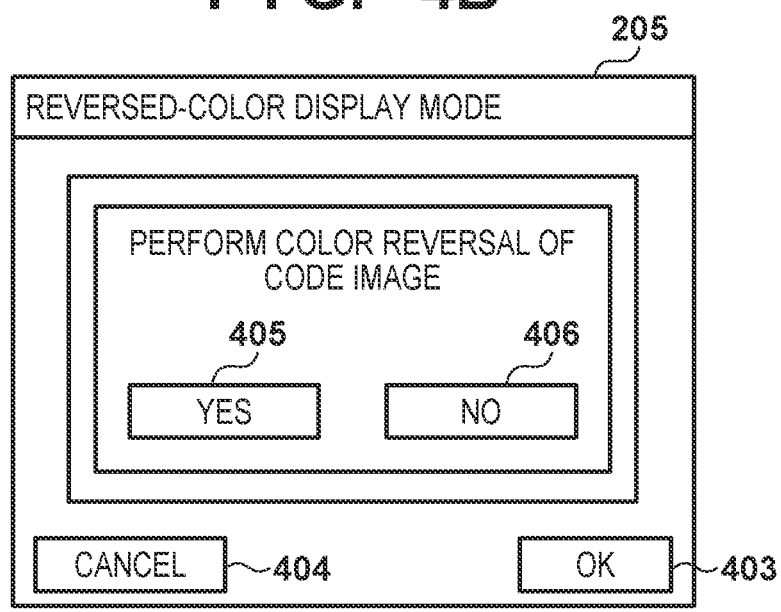

Next, a second embodiment of the present invention will be described. In the second embodiment, configuration is such that it is possible, if the reversed-color display mode is set, to select whether to display a code image such as the QR code without reversal, or to display by reversing, as illustrated in FIG. 4B. Note that a system configuration or a configuration of the printing apparatus 101 in according to the second embodiment is the same as that of the first embodiment previously described, and thus explanation thereof is omitted.

FIG. 4B illustrates an example of a setting screen for separately setting whether to perform a color reversal with respect to a code image, according to the second embodiment. If the reversed-color display mode is set in the screen of FIG. 4A, a screen for setting whether or not to perform a color reversal of a code image is displayed on the console unit 205. If a "YES" button 405 is selected, performing the color reversal with respect to the code image is set, and if a "NO" button 406 is selected, displaying without performing the color reversal of the code image is set. In FIG. 4B, similarly to in FIG. 4A, when an OK button 403 is pressed a setting in this screen is stored to the HDD 204 as setting information, and when a cancel button 404 is pressed a setting in this screen is cancelled.

Figure 7:
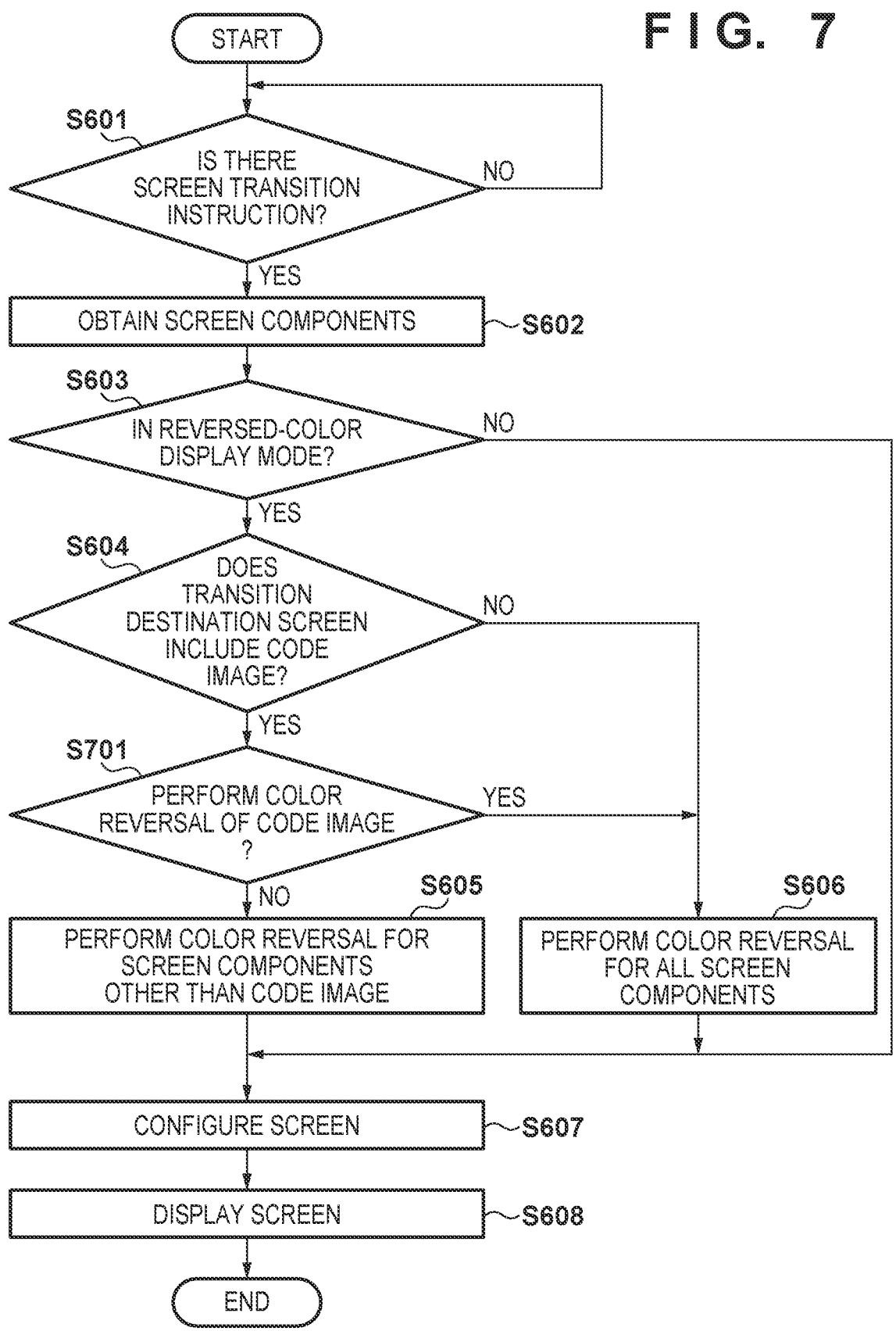
FIG. 7 is a flowchart for describing processing when a printing apparatus according to a second embodiment displays a screen in the console unit.

FIG. 7 is a flowchart for describing processing when the printing apparatus 101 according to the second embodiment displays a screen on the console unit 205. Note that this processing is realized by the CPU 201 deploying a program stored in the HDD 204 to the RAM 203 and executing the deployed program. In FIG. 7, steps in common with the flowchart of FIG. 6 previously described are illustrated with the same reference numeral, and explanation thereof is omitted.

Here, if the reversed-color display mode is set and the transition destination screen includes a code image such as the QR code, the processing proceeds to step S701. In step S701, the CPU 201 determines whether or not reversing a code image has been set by the screen of FIG. 4B, based on setting information stored in the HDD 204. When performing the color reversal for the code image is set, the processing proceeds to step S606, and the color reversal is performed for all screen components. Meanwhile, when performing the color reversal for the code image is not set, the processing proceeds to step S605, and a color reversal is performed for screen components other than the code images.

By the second embodiment, similarly to the first embodiment, even if a reversed-color display mode is set, it is possible to display a code image such as the QR code without reversal.

Third Embodiment

Next, explanation will be given for a third embodiment of the present invention. In the third embodiment, explanation is given of a case of displaying a screen in a reversed-color display mode by the display control module 311 processing a color reversal in one batch for screen components of the screen. Note that a system configuration or a configuration of the printing apparatus 101 in according to the third embodiment is the same as that of the first embodiment previously described, and thus explanation thereof is omitted.

Figure 8:
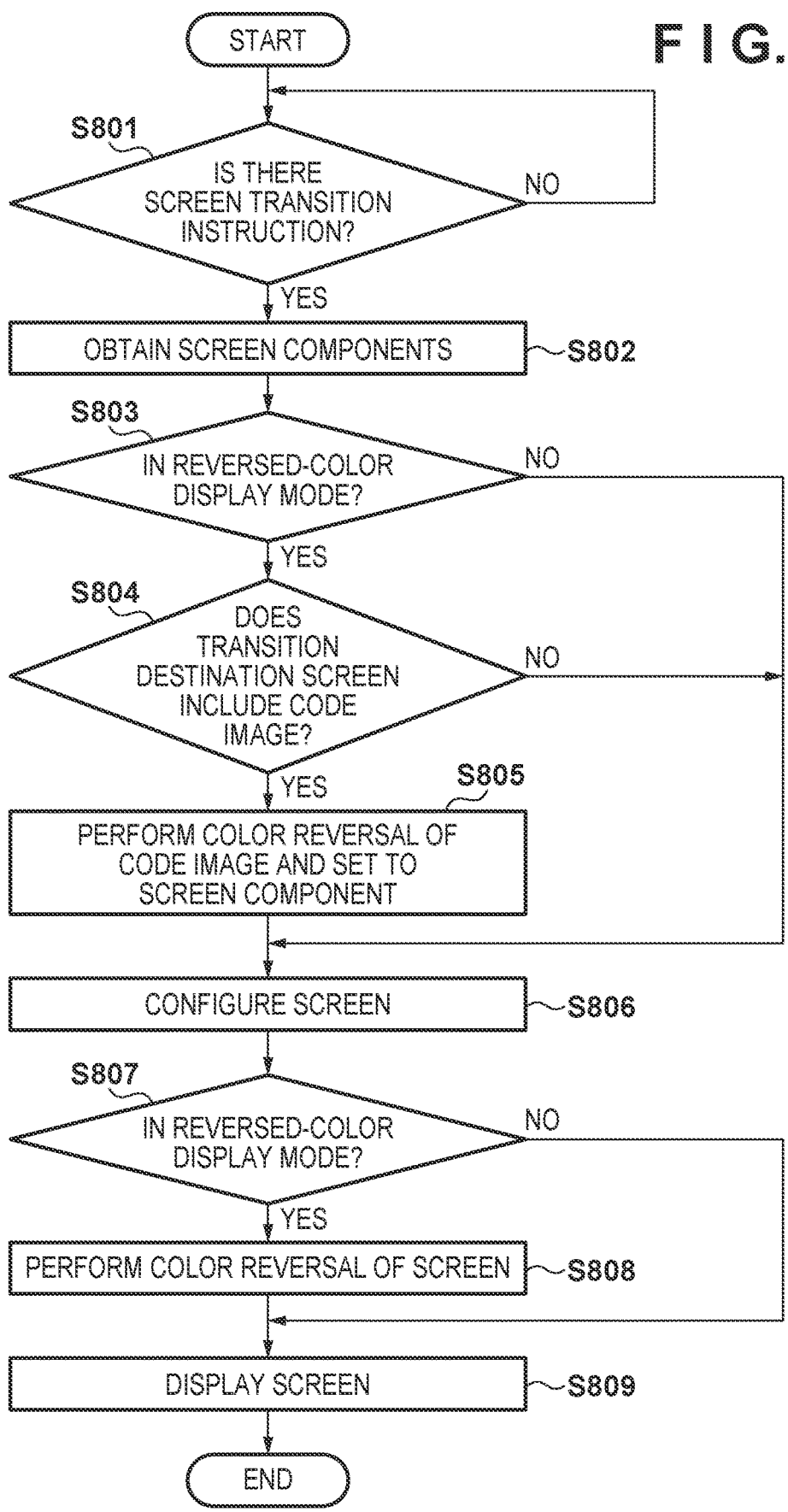
FIG. 8 is a flowchart for describing processing when a printing apparatus according to a third embodiment, after configuring a screen from screen components, performs color reversal processing on the whole screen all at once and displays it.

FIG. 8 is a flowchart for describing processing when the printing apparatus 101 according to the third embodiment, after configuring a screen from screen components, performs color reversal processing on the whole screen all at once and displays it. Note that this processing is realized by the CPU 201 deploying a program stored in the HDD 204 to the RAM 203 and executing the deployed program.

Note that, in FIG. 8, processing for step S801 through step S804 is the same as step S601 through step S604 of the flowchart of FIG. 6 previously described, and thus explanation thereof is omitted.

If the CPU 201 determines in step S804 that the reversed-color display mode is set and that a transition destination screen includes a code image such as the QR code, the processing proceeds to step S805. In step S805, the CPU 201 substitutes a screen component that is the code image with a screen component of the code image that has been subjected to the color reversal. The processing then proceeds to step S806 and a screen that includes the screen component that includes the code image that has been subject to the color reversal is generated.

Figure 9A:
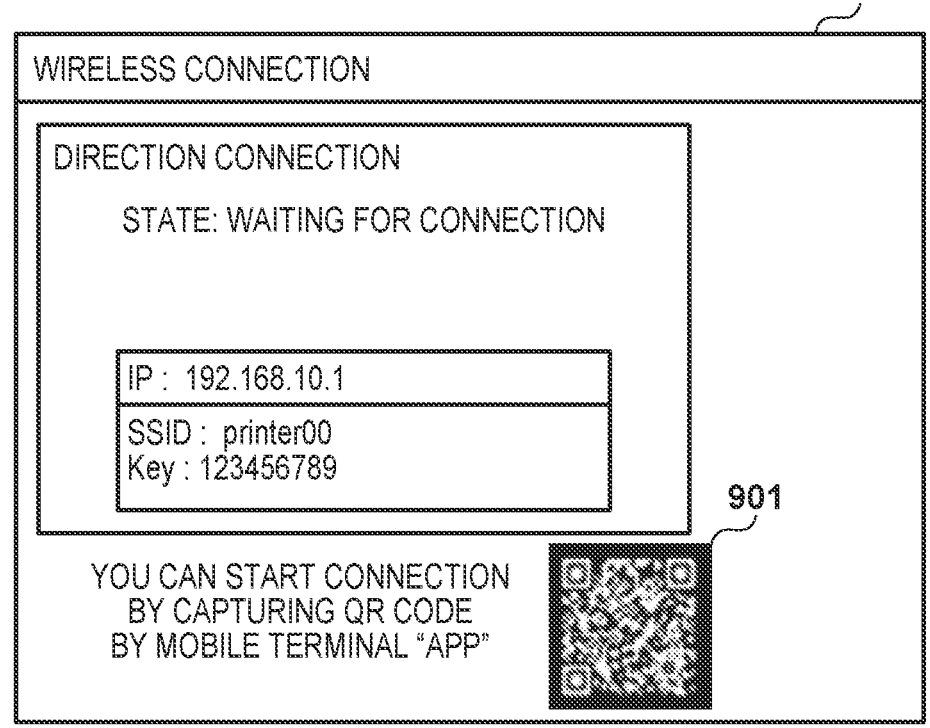
FIG. 9A depicts a view illustrating an example of an image of a screen generated in the third embodiment.

FIG. 9A depicts a view illustrating an example of an image of a screen generated in step S806 at this point. Here only a screen component that is a QR code 901 is displayed with the color reversal, and other screen components are displayed without the color reversal. Note that the screen component of the QR code that has been subjected to the color reversal may be generated in advance at any timing such as a time of an activation of the printing apparatus 101.

Figure 9B:
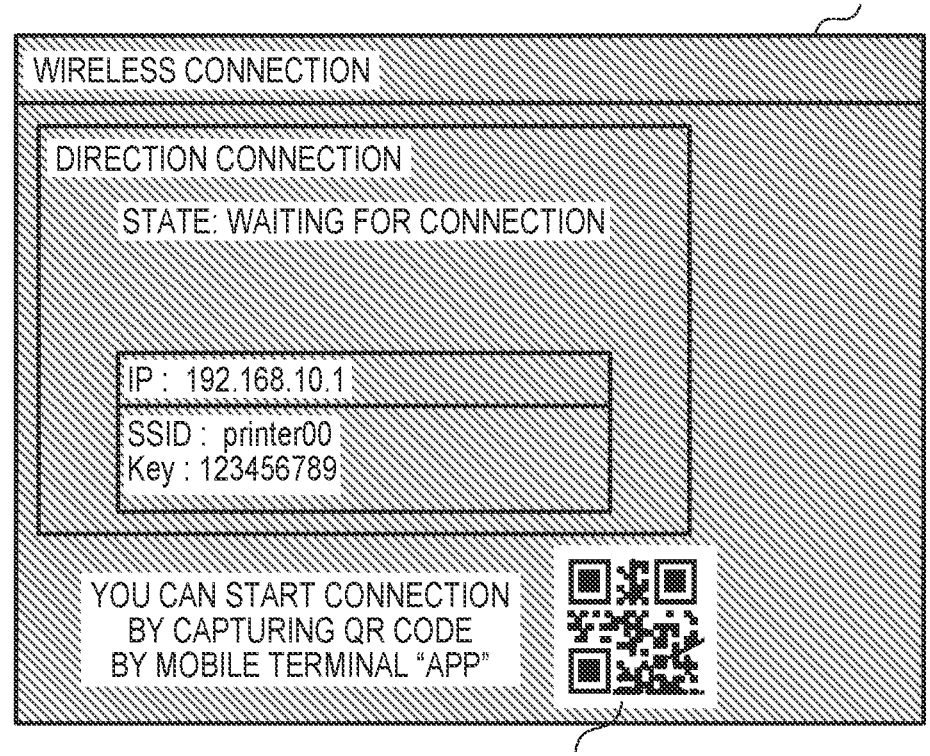
FIG. 9B depicts a view illustrating an example of displaying the image of FIG. 9A.

In this way in step S806, the CPU 201 functions as the display control module 311 to configure a screen by using each screen component, and then the processing proceeds to step S807. In step S807, the CPU 201, similarly to in step S803, determines whether or not the reversed-color display mode is set, and if so, the processing proceeds to step S808, and processing for the color reversal is collectively executed with respect to the screen configured in step S806. By this, configuration of the screen in the reversed-color display mode completes, and as illustrated in FIG. 9B for example, it is possible to configure the screen that includes the QR code 902 that has not been subject to the color reversal. The processing proceeds to step S809, and the CPU 201 functions as the display control module 311 to display the screen configured for the normal display mode of the reversed-color display mode on the display unit of the console unit 205, and this processing ends.

By virtue of the third embodiment, it is possible to display a code image without the color reversal, even when performing the color reversal for a whole screen in one batch, by configuring a screen by image components in which the color reversal is performed for the code image in advance as with the QR code 901.

In the third embodiment, similarly to the second embodiment, a configuration in which, if the reversed-color display mode is set, it is possible to select whether or not to display a code image such as the QR code without reversal or to display by reversing may be provided. In this case, the determination process of step S701 of FIG. 7 is included between step S804 and step S805 of the flowchart of FIG. 8. Configuration may be taken such that the processing proceeds to step S805 when not reversing the code image is set in the screen of FIG. 4B.

Note that, in the first through the third embodiments as described above, explanation was given in accordance with a case of displaying a screen, but it goes without saying that application can be made to a case in which an image that includes a code image is subject to a color reversal before printing.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-101937, filed May 20, 2016, which is hereby incorporated by reference herein in its entirety.

What is claimed is:

1. A communication apparatus, comprising:
a display device;
one or more memories configured to store instructions; and
one or more processors configured to execute the instructions to:
   set whether a reversed color mode for displaying a screen with a reversed color is enabled or not; and
   in a case that a screen to be displayed on the display device is a predetermined screen including at least a first display object corresponding to a code image to be read by an external apparatus and a second display object being different from the first display object, control to display, on the display device, the first display object corresponding to the code image without reversing color even if the reversed color mode is set to be enabled.

2. The communication apparatus according to claim 1, wherein the one or more processors execute the instructions further to:
in a case that the screen to be displayed on the display device is the predetermined screen and the reversed color mode is set to be enabled, control to display, on the display device, the second display object with the reversed color.

3. The communication apparatus according to claim 1, wherein the one or more processors execute the instructions further to:
in a case that the screen to be displayed on the display device is the predetermined screen and the reversed color mode is set to be enabled, create first screen data including the first display object on which color information of the code image has been reversed,
wherein the predetermined screen is displayed, on the display device, using second image data that is obtained performing reversed color processing on the entire of the first image data.

4. The communication apparatus according to claim 1, wherein the one or more processors execute the instructions further to:
in a case that the screen to be displayed on the display device is the predetermined screen and the reversed color mode is set to be enabled, perform a reversed color processing on a display region other than a display region corresponding to the first display object, and not perform the reversed color processing on the display region corresponding to the first display object.

5. The communication apparatus according to claim 1, wherein the code image is an image of a QR code.

6. The communication apparatus according to claim 1, wherein the code image is an image for the communication apparatus to provide the external apparatus with information for establishing a network communication via an access point.

7. The communication apparatus according to claim 1, wherein the communication apparatus is a printing apparatus.

8. A method of controlling a communication apparatus having a display device, the method comprising:
setting whether a reversed color mode for displaying a screen with a reversed color is enable or not; and
in a case that a screen to be displayed on the display device is a predetermined screen including at least a first display object corresponding to a code image to be read by an external apparatus and a second display object being different from the first display object, controlling to display, on the display device, the first display object corresponding to the code image without reversing color even if the reversed color mode is set to be enabled.

9. The method according to claim 8, further comprising:
in a case that the screen to be displayed on the display device is the predetermined screen and the reversed color mode is set to be enabled, controlling to display, on the display device, the second display object with the reversed color.

10. The method according to claim 8, further comprising:
in a case that the screen to be displayed on the display device is the predetermined screen and the reversed color mode is set to be enabled, creating first screen data including the first display object on which color information of the code image has been reversed,
wherein the predetermined screen is displayed, on the display device, using second image data that is obtained performing reversed color processing on the entire of the first image data.

11. The method according to claim 8, further comprising:
in a case that the screen to be displayed on the display device is the predetermined screen and the reversed color mode is set to be enabled, performing a reversed color processing on a display region other than a display region corresponding to the first display object, and not perform the reversed color processing on the display region corresponding to the first display object.

12. The method according to claim 8, wherein the code image is an image of a QR code.

13. The method according to claim 8, wherein the code image is an image for the communication apparatus to provide the external apparatus with information for establishing a network communication via an access point.

14. The method according to claim 8, wherein the communication apparatus is a printing apparatus.

15. A non-transitory computer-readable storage medium storing a program for causing a processor to execute a method of controlling a communication apparatus having a display device, the method comprising:
setting whether a reversed color mode for displaying a screen with a reversed color is enable or not; and
in a case that a screen to be displayed on the display device is a predetermined screen including at least a first display object corresponding to a code image to be read by an external apparatus and a second display object being different from the first display object, controlling to display, on the display device, the first display object corresponding to the code image without reversing color even if the reversed color mode is set to be enabled.

* * * * *